(12) United States Patent
Morishima et al.

(10) Patent No.: US 9,543,570 B2
(45) Date of Patent: *Jan. 10, 2017

(54) NONAQUEOUS ELECTROLYTE SECONDARY BATTERY

(71) Applicant: KABUSHIKI KAISHA TOSHIBA, Minato-ku (JP)

(72) Inventors: Hideaki Morishima, Kashiwazaki (JP); Takashi Kobayashi, Kashiwazaki (JP); Masaomi Nakahata, Kamakura (JP); Kazuhiko Mori, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 401 days.

This patent is subject to a terminal disclaimer.

(21) Appl. No.: 13/974,601

(22) Filed: Aug. 23, 2013

(65) Prior Publication Data

US 2013/0344389 A1 Dec. 26, 2013

Related U.S. Application Data

(63) Continuation of application No. PCT/JP2012/053074, filed on Feb. 10, 2012.

(30) Foreign Application Priority Data

Feb. 23, 2011 (JP) .................................. 2011-037276

(51) Int. Cl.
*H01M 4/131* (2010.01)
*H01M 2/26* (2006.01)
(Continued)

(52) U.S. Cl.
CPC .............. *H01M 4/131* (2013.01); *H01M 2/26* (2013.01); *H01M 4/0435* (2013.01); *H01M 4/485* (2013.01);
(Continued)

(58) Field of Classification Search
CPC .................................................. H01M 10/0525
(Continued)

(56) References Cited

U.S. PATENT DOCUMENTS

2007/0231693 A1 10/2007 Inagaki et al.
2008/0176142 A1 7/2008 Inagaki et al.
(Continued)

FOREIGN PATENT DOCUMENTS

CN 101154744 A 4/2008
CN 101847745 A 9/2010
(Continued)

OTHER PUBLICATIONS

U.S. Appl. No. 13/974,436, filed Aug. 23, 2013, Morishima, et al.
(Continued)

*Primary Examiner* — Jonathan Jelsma
*Assistant Examiner* — Rashid Alam
(74) *Attorney, Agent, or Firm* — Oblon, McClelland, Maier & Neustadt, L.L.P.

(57) ABSTRACT

According to one embodiment, there is provided a nonaqueous electrolyte secondary battery. A negative electrode current collector comprises a coated portion on which the negative electrode active material layer is provided and a noncoated portion which is adjacent to the coated portion, in which the negative electrode active material layer is not present. A density of the negative electrode active material layer is within a range of 2.1 g/cc to 2.4 g/cc. A ratio W1/W2 of a mass of the coated portion per unit area (W1) to a mass of the noncoated portion per unit area (W2) is from 0.997 to 1.

11 Claims, 2 Drawing Sheets

(51) Int. Cl.
    *H01M 10/0587*    (2010.01)
    *H01M 4/66*       (2006.01)
    *H01M 4/02*       (2006.01)
    *H01M 4/04*       (2006.01)
    *H01M 4/485*      (2010.01)
    *H01M 10/0525*    (2010.01)

(52) U.S. Cl.
    CPC ......... *H01M 4/661* (2013.01); *H01M 10/0525* (2013.01); *H01M 10/0587* (2013.01); *H01M 2004/021* (2013.01); *Y02E 60/122* (2013.01); *Y02T 10/7011* (2013.01)

(58) Field of Classification Search
    USPC .......................................................... 429/231
    See application file for complete search history.

(56) References Cited

U.S. PATENT DOCUMENTS

| | | | |
|---|---|---|---|
| 2009/0061303 A1 | 3/2009 | Inagaki et al. | |
| 2010/0015514 A1 | 1/2010 | Miyagi et al. | |
| 2010/0233543 A1 | 9/2010 | Numata et al. | |
| 2011/0129722 A1* | 6/2011 | Yoneda | ........................ 429/162 |
| 2011/0262802 A1* | 10/2011 | Uono | .................... B82Y 30/00 429/188 |
| 2013/0022861 A1 | 1/2013 | Miyagi et al. | |
| 2013/0074711 A1 | 3/2013 | Uematsu et al. | |

FOREIGN PATENT DOCUMENTS

| | | |
|---|---|---|
| EP | 1 939 971 A1 | 7/2008 |
| JP | 11-185736 | 7/1999 |
| JP | 2000-251942 | 9/2000 |
| JP | 2004-296256 | 10/2004 |
| JP | 2004-335374 | 11/2004 |
| JP | 2005-93236 | 4/2005 |
| JP | 2006-079942 | 3/2006 |
| JP | 2007-273390 | 10/2007 |
| JP | 2010-147030 | 7/2010 |
| JP | 2012-174434 | 9/2012 |
| WO | WO 2008/015987 A1 | 2/2008 |

OTHER PUBLICATIONS

U.S. Appl. No. 13/969,047, filed Aug. 16, 2013, Kobayashi, et al.
Combined Chinese Office Action and Search Report issued Nov. 24, 2014 in Patent Application No. 201280003689.2 (with English Translation).
Extended European Search Report issued Nov. 19, 2014 in Patent Application No. 12748826.0.
International Search Report issued May 1, 2012 in PCT/JP2012/053074 filed Feb. 10, 2012.
Office Action issued Oct. 14, 2015 in European Patent Application No. 12 748 826.0.
Office Action issued on Jul. 23, 2015 in the corresponding Chinese Patent Application No. 201280003689.2 (with English Translation).
Office Action issued on Jan. 15, 2016 in Chinese Patent Application No. 201280003689.2 with English translation.
Office Action in corresponding Chinese application No. 201280003689.2, dated Jul. 8, 2016. (w/English Translation).

* cited by examiner

NONAQUEOUS ELECTROLYTE SECONDARY BATTERY

CROSS REFERENCE TO RELATED APPLICATIONS

This application is a Continuation Application of PCT Application No. PCT/JP2012/053074, filed Feb. 10, 2012 and based upon and claiming the benefit of priority from Japanese Patent Application No. 2011-037276, filed Feb. 23, 2011, the entire contents of all of which are incorporated herein by reference.

FIELD

Embodiments described herein relate generally to a nonaqueous electrolyte secondary cell.

BACKGROUND

In recent years, use of a nonaqueous electrolyte secondary battery as a power source for hybrid electric vehicles or as an electric storage device for power generators using natural energy such as solar light and wind has been studied. A load on a power source for a vehicle considerably fluctuates depending on a travelling state of the vehicle and the like. A power generation amount of a power generator considerably fluctuates depending on environmental conditions. Therefore, a nonaqueous electrolyte secondary battery is sometimes required to discharge or store a large current in a short time. Therefore, the nonaqueous electrolyte secondary battery is desired to have an excellent large current property. However, in the case where an internal resistance of the battery is large, there is a problem that performance is deteriorated when charge-discharge is performed at a large current.

CITATION LIST

Patent Literature

Patent Literature 1: Japanese Patent Application Publication No. 2004-296256
Patent Literature 2: Japanese Patent Application Publication No. 2006-79942

DETAILED DESCRIPTION

There is provided a nonaqueous electrolyte secondary battery having a small internal resistance and an excellent large current property.

In general, according to one embodiment, there is provided a nonaqueous electrolyte secondary battery comprising a positive electrode, a negative electrode, and a nonaqueous electrolyte. The positive electrode comprises a positive electrode current collector having a first surface and a first positive electrode active material layer provided on a part of the first surface. The negative electrode comprises a negative electrode current collector having a second surface opposed to the first surface and a first negative electrode active material layer provided on a part of the second surface. The negative electrode current collector comprises a second coated portion on which the first negative electrode active material layer is provided and a second noncoated portion which is adjacent to the second coated portion in a direction parallel to the second surface, in which the first negative electrode active material layer is not present. The second noncoated portion is adjacent to at least one edge of the negative electrode current collector and extends along the at least one edge. A length from a boundary between the second coated portion and the second noncoated portion to the at least one edge of the negative electrode current collector is within a range of 5 mm to 20 mm. A density of the first negative electrode active material layer is within a range of 2.1 g/cc to 2.4 g/cc. A ratio W1/W2 of a mass of the second coated portion per unit area (W1) to a mass of the second noncoated portion per unit area (W2) is from 0.997 to 1.

Hereinafter, the embodiments will be described with reference to the drawings.

First Embodiment

Figure 1:
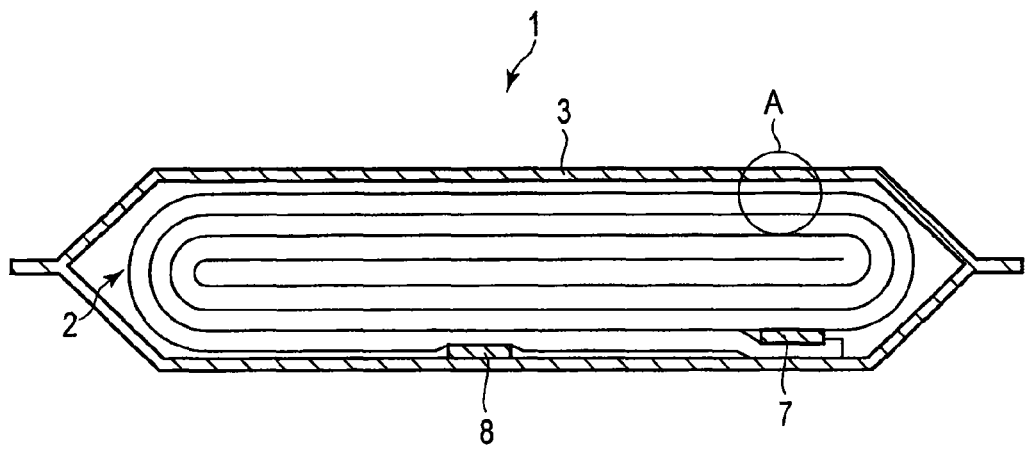
FIG. 1 is a block diagram showing a cross-section of a flat nonaqueous electrolyte battery according to embodiments.
Figure 2:
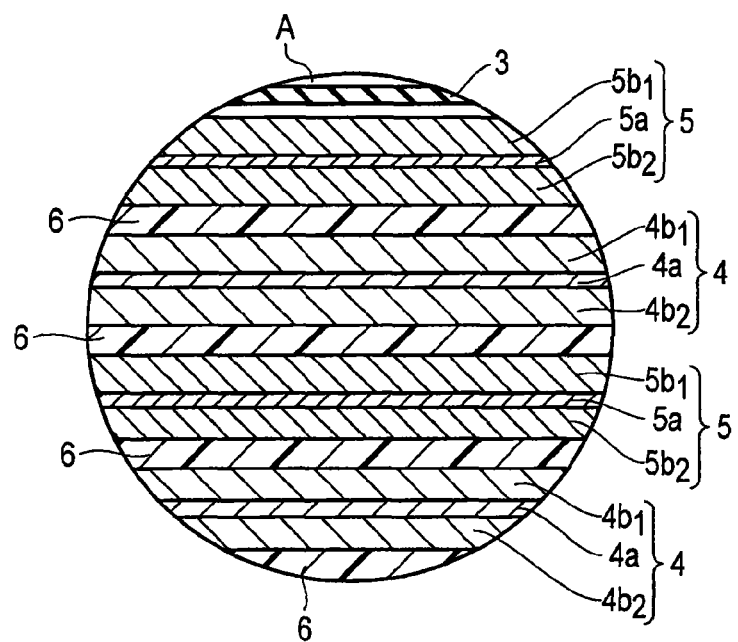
FIG. 2 is an enlarged sectional view showing Part-A of FIG. 1.

FIG. 1 is a block diagram showing a cross-section of a flat nonaqueous electrolyte battery 1. FIG. 2 is an enlarged sectional view showing Part-A of FIG. 1. The nonaqueous electrolyte battery 1 is provided with a wound electrode group 2. The wound electrode group 2 is housed in a container 3. Further, the container 3 is filled with a nonaqueous electrolyte (not shown).

As shown in FIG. 2, the wound electrode group 2 is formed of a positive electrode 4, a negative electrode 5, and a separator 6. The wound electrode 2 is formed by laminating the positive electrode 4 and the negative electrode 5 with the separator 6 being sandwiched therebetween and winding in the form of a flat shape.

As shown in FIG. 1, in the vicinity of an outer peripheral edge of the wound electrode group 2, a positive electrode terminal 7 is electrically connected to the positive electrode 4, and a negative electrode terminal 8 is electrically connected to the negative electrode 5.

A baggy container made from a laminate film is used for the container 3. The electrode group 2 and the nonaqueous electrolyte are tightly sealed by heat-sealing an opening of the laminate film baggy container in a state where the positive electrode terminal 7 and the negative electrode terminal 8 are extended to outside through an opening of the baggy container. The container is not limited to the one made from laminate film, and a metal can, for example, may be used for the container.

<Positive Electrode>

As shown in FIG. 2, the positive electrode 4 is provided with a positive electrode current collector 4a and a positive electrode active material layer 4b. The positive electrode active material layer 4b includes a positive electrode active material and arbitrarily includes a conductive agent and a binder. The positive electrode active material layer 4b is provided on one or both of surfaces of the positive electrode current collector 4a.

As the positive electrode active material contained in the positive electrode active material layer 4b, a lithium transition metal composite oxide may be used. Examples thereof include $LiCoO_2$, $Li_{1+a}(Mn,Ni,Co)_{1-a}O_2$ (0.0<a<0.2), $Li_{1+b}$ $Ni_{1-b-c}M1_cO_2$ (0.0<b<0.2, 0.0<c<0.4, and M1 is at least one element selected from Co, Al, and Fe), $Li_{1+d}Mn_{2-d-e}M2_eO_4$ (0<d<0.3, 0<e<0.3, and M2 is at least one element selected from Mg, Al, Fe, Co, and Ni), $LiM3PO_4$ (M3 is at least one element selected from Fe, Co, and Ni). These composite oxides may be used alone or in combination of a plurality of types thereof.

The conductive agent is used for suppressing a contact resistance between the active material and the current collector. Examples thereof include a carbonaceous material such as acetylene black, carbon black, and graphite.

The binder is used for binding the active material and the conductive agent together. Examples thereof include polytetrafluoroethylene (PTFE), polyvinylidene fluoride (PVdF), and a fluorine-based rubber.

A mixing ratio among the positive electrode active material, the conductive agent, and the binder may preferably be such that the positive electrode active material is from 80% by mass to 95% by mass, the conductive agent is from 3% by mass to 18% by mass, and the binder is from 2% by mass to 17% by mass. The above-described effects are attained when the conductive agent is contained in the amount of 3% by mass or more, and it is possible to suppress decomposition of the nonaqueous electrolyte on a conductive agent surface under a high temperature storage when the conductive agent is contained in the amount of 18% by mass or less. It is possible to attain satisfactory electrode strength when the binder is contained in the amount of 2% by mass or more, and it is possible to reduce the internal resistance through a reduction of an amount of an insulator to be mixed when the binder is contained in the amount of 17% by mass or less.

The positive electrode current collector 4a may preferably be an aluminium foil or an aluminium alloy foil containing one or more element(s) selected from the group consisting of Mg, Ti, Zn, Mn, Fe, Cu, and Si.

It is possible to produce the positive electrode by preparing a slurry by suspending the positive electrode active material, the conductive agent, and the binder into a widely-used solvent, forming the positive electrode layer by coating and drying the slurry on the positive electrode current collector, and rolling.

As the solvent, N-methylethyl pyrrolidone may be used, for example. A mixing ratio of a total mass of the positive electrode active material, the conductive agent and the binder to a mass of the solvent is preferably within a range of 50:50 to 80:20.

<Negative Electrode>

The negative electrode 5 is provided with a negative electrode current collector 5a and a negative electrode active material layer 5b. The negative electrode active material layer 5b includes a negative electrode active material and arbitrarily includes a conductive agent and a binder. The negative electrode active material layer 5b is provided on one or both of surfaces of the negative electrode current collector 5a.

Figure 3:
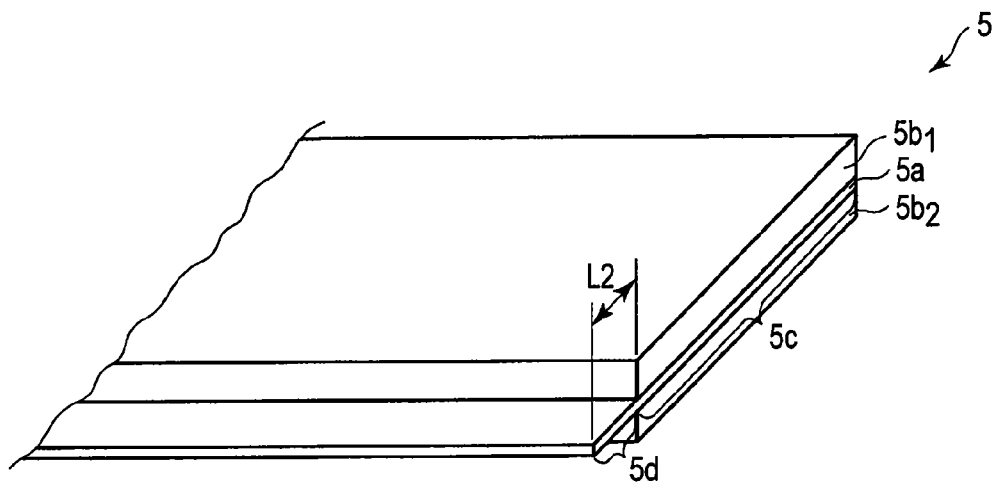
FIG. 3 is a perspective view showing a part of a negative electrode.

FIG. 3 is a perspective view showing one example of the negative electrode. FIG. 3 shows a part of the negative electrode 5 in which the negative electrode active material layer 5b is provided on each of both surfaces of the negative electrode current collector 5a. One of the surfaces of the negative electrode current collector 5a which is opposed to the positive electrode 4 is referred to as a second surface. A first negative electrode active material layer $5b_1$ is provided on a part of the second surface. A second negative electrode active material layer $5b_2$ is provided on a part of a surface reverse to the second surface of the negative electrode current collector 5a.

The negative electrode current collector 5a includes a second coated portion 5c on which the first negative electrode active material layer $5b_1$ is provided and a second noncoated portion 5d which is adjacent to the second coated portion 5c in a direction parallel to the second surface, in which the first negative electrode active material layer $5b_1$ is not present.

The second noncoated portion 5d is adjacent to at least one edge of the negative electrode current collector 5a and extends along the at least one edge. The second noncoated portion 5d functions as a negative electrode tab. The negative electrode terminal 8 shown in FIG. 1 is connected to the second noncoated portion 5d directly or via a conduction member such as a lead. Thus, the negative electrode 5 and the negative electrode terminal 8 are electrically connected to each other.

In the present embodiment, a length from a boundary between the second coated portion 5c and the second noncoated portion 5d to the edge to which the second noncoated portion 5d is adjacent is referred to as L2. L2 is within a range of 5 mm to 20 mm. When L2 is 5 mm or more, it is possible to increase a contact area for the second noncoated portion 5d with the negative electrode terminal 8 or the conduction member. Thus, it is possible to reduce a contact resistance between them. As a result, a reduction of internal resistance is enabled. Further, when L2 is 20 mm or less, it is possible to prevent a reduction of energy density. A minimum value of the length from the boundary between the second coated portion 5c and the second noncoated portion 5d to the edge of the negative electrode current collector is 5 mm or more, and a maximum value of the length is 20 mm or less.

Further, in the present embodiment, a density of the first negative electrode active material layer $5b_1$ is within a range of 2.1 g/cc to 2.4 g/cc. When the density of the first negative electrode active material layer $5b_1$ is within the above range, it is possible to improve physical contact for the negative electrode current collector 5a with the negative electrode active material. As a result, it is possible to reduce the internal resistance. A density of the second negative electrode active material layer $5b_2$ is preferably within the above range.

As used herein, the term "density" means a value calculated from a volume and a mass, in which the volume is calculated by measuring a thickness and an area of the negative electrode active material layer. More specifically, the term "density" means a so-called bulk density which is a density in the case where pores including both of apertures communicated with an ambient air and apertures which are not communicated with the ambient air and are isolated in the negative electrode active material layer are counted into the calculation.

A ratio W1/W2 of a mass of the second coated portion 5c per unit area (W1) to a mass of the second noncoated portion 5d per unit area (W2) is from 0.997 to 1. The mass ratio W1/W2 is obtained by measuring a mass per unit area (for example, $g/cm^2$) of each of the second coated portion 5c and the second noncoated portion 5d and calculating from the results.

When the mass ratio (W1/W2) is within the above range, it is possible to diminish a difference in mass per unit area between the second coated portion 5c and the second noncoated portion 5d. Accordingly, it is possible to diminish skewness of the electrode. When the skewness of the electrode is small, a gap is unlikely to be formed between the electrodes in winding or stacking the electrodes. As a result, it is possible to reduce the electric resistance inside the cell. Thus, it is possible to provide the negative electrode having small internal resistance.

The second negative electrode active material layer $5b_2$ may preferably be provided only on the second coated portion. More specifically, the first negative electrode active material layer $5b_1$ and the second negative electrode active material layer $5b_2$ are provided at positions where they are opposed to each other with the negative electrode current collector $4a$ being sandwiched therebetween.

As the negative electrode active material contained in the negative electrode active material layer $5b$, a titanium-containing metal composite oxide may be used, for example. Examples thereof include a lithium titanium oxide and a titanium-based oxide which does not contain lithium in the synthesis but can contain lithium by charge-discharge.

Examples of the lithium titanium oxide include $Li_{4+x}Ti_5O_{12}$ (0≤x≤3) having a spinel structure and $Li_{2+y}Ti_3O_7$ (0≤y≤3) having a ramsdellite structure.

Examples of the titanium-based oxide include $TiO_2$ and a metal composite oxide containing at least one element selected from the group consisting of P, V, Sn, Cu, Ni, Co and Fe, and Ti. As $TiO_2$, those having an anatase structure, subjected to a heat treatment at 300° C. to 500° C., and having low crystallinity are preferred.

Examples of the metal composite oxide include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, Co, and Fe). The metal composite oxide may preferably be those in which a crystal phase and an amorphous phase are coexistent or those having a microstructure in which an amorphous phase solely exists. The metal composite oxide which has the microstructure is capable of greatly improving a cycle property.

The negative electrode active material may more preferably be selected from the lithium titanium oxides and the metal composite oxides containing at least one element of P, V, Sn, Cu, Ni, Co and Fe, and Ti.

The conductive agent is used for suppressing a contact resistance between the active material and the current collector. Examples thereof include a carbonaceous material such as acetylene black, carbon black, and graphite.

The binder is used for binding the active material and the conductive agent together. Examples thereof include polytetrafluoroethylene (PTFE), polyvinylidene fluoride (PVdF), a fluorine-based rubber, and a styrene butadiene rubber.

A mixing ratio among the negative electrode active material, the conductive agent, and the binder is preferably such that the negative electrode active material is from 70% by mass to 96% by mass, the conductive agent is from 2% by mass to 28% by mass, and the binder is from 2% by mass to 28% by mass. When the conductive agent is contained in the amount of 2% by mass or more, a power collection property of the negative electrode layer is improved, whereby the large current property of the battery is improved. When the binder is contained in the amount of 2% by mass or more, the binding property between the negative electrode layer and the negative electrode current collector is improved, whereby a cycle property is improved. On the other hand, from the viewpoint of attaining high capacity, each of the conductive agent and the binder may preferably be contained within the range of 28% by mass or less.

The negative electrode current collector $5a$ may preferably be an aluminium foil, an aluminium alloy foil containing one or more element(s) selected from the group consisting of Mg, Ti, Zn, Mn, Fe, Cu and Si, or a copper foil. The aluminum foil or the above-described aluminium alloy foil is more preferred since they are electrochemically stable in a potential range nobler than 1.0 V.

It is possible to provide the nonaqueous electrolyte battery which is excellent in large current property by using the negative electrode having the above-described configuration.

Hereinafter, a negative electrode production method will be described.

To start with, a slurry is prepared by suspending the negative electrode active material, the conductive agent, and the binder into a solvent. As the solvent, N-methylethyl pyrrolidone may be used, for example. A mixing ratio of a total mass of the negative electrode active material, the conductive agent and the binder to a mass of the solvent may preferably be within a range of 50:50 to 80:20.

Next, a negative electrode active material layer is formed by coating the slurry on one or both of surfaces of the negative electrode current collector, followed by drying. The slurry is coated on the negative electrode current collector except for the noncoated portions which are successively aligned at a constant width. The second noncoated portion is preferably adjacent to an edge which is along a longitudinal direction of the negative electrode current collector. Alternatively, two second noncoated portions may be provided in such a manner that the second noncoated portions respectively are adjacent to both edges which are along the longitudinal direction of the negative electrode current collector. A length of the second noncoated portion is adjusted to be within a range of 5 mm to 20 mm. The length of the second noncoated portion means a length from a boundary between the second coated portion and the second noncoated portion to the edge of the negative electrode current collector to which the second noncoated portion is adjacent. If the negative electrode is used for a wound electrode group, the length means a length which is in a direction perpendicular to the longitudinal direction of the negative electrode.

Next, the negative electrode current collector on which the negative electrode active material layer is formed is rolled in such a manner that a density of the negative electrode active material layer is within a range of 2.1 g/cc to 2.4 g/cc. The rolling may be performed using a roller press machine.

In the rolling step, the negative electrode current collector is rolled together with the negative electrode active material layer. However, since a diameter of the roller is constant, the roller does not contact with the second noncoated portion on which the active material layer is not coated. Therefore, the second coated portion on which the active material layer is coated is rolled to reduce the mass per unit area (W1), while the second noncoated portion is not rolled to keep the mass per unit area (W2) unchanged. As a result, the mass of the second coated portion per unit area (W1) is smaller than the mass of the second noncoated portion per unit area (W2). More specifically, the mass ratio (W1/W2) is less than 1.0, for example, about 0.995. It is difficult to make the mass ratio (W1/W2) to be 0.997 or more even if the rolling is performed using a roller having a diameter exceeding 400 mm, for example.

In the case where the mass ratio (W1/W2) is less than 0.997, a stress is generated on a boundary between the second coated portion and the second noncoated portion to cause skewness of the entire electrode. The skewed electrodes generate a gap between electrodes when the electrodes are wound or cut into a predetermined size and stacked, thereby increasing a gap between electrode plates of the positive electrode and the negative electrode. As a result, an electric resistance inside the battery is increased, thus, a large current property is deteriorated.

However, according to the present embodiment, it is possible to make the mass ratio (W1/W2) to be 0.997 or more by reducing the mass per unit area (W2) by drawing the second noncoated portion. The drawing of the second noncoated portion is realized by performing tension processing on the entire negative electrode. In the tension processing, tension is applied to the entire negative electrode in a direction parallel to the boundary between the second coated portion and the second noncoated portion. The tension processing enables a selective drawing of the noncoated portion.

It is considered that the second noncoated portion is selectively drawn due to concentration of the tension on the second noncoated portion even when the tension is applied evenly onto the entire negative electrode since the second noncoated portion is not rolled while the second coated portion is rolled. For example, an aluminum foil which is generally used for a current collector is drawn when tension which is approximately equivalent to 100 N/mm$^2$ is applied in a direction perpendicular to a cross-section. Therefore, tension of about 1500 N/m is required for drawing an aluminum having a thickness of 15 μm. However, it is possible to draw the second noncoated portion with tension of about 300 N/m in the tension processing in the present embodiment. This indicates that it is possible to selectively draw the second noncoated portion even when the tension is evenly applied on the entire negative electrode.

Further, according to the present embodiment, it is possible to prevent fracture of the electrode since it is possible to draw the noncoated portion with the tension of about 300 N/m.

The tension processing may be performed using a rewinder provided with a withdrawing device and a winding device, for example. It is possible to control tension T to be applied on an electrode by adjusting a brake force of the withdrawing device and a winding force of the winding device. The tension processing is performed by subjecting the electrode after the rolling processing to withdrawing and winding while controlling the tension T through the rewinder. The tension T may preferably be within a range of 100 N/m to 600 N/m. It is possible to draw the first noncoated portion without fracture of the electrode by applying the tension within the range, thereby making it possible to attain the mass ratio (W1/W2) of 0.997 or more.

The second noncoated portion may be heated when performing the tension processing. Since a stress required for plastic deformation becomes smaller than 100 N/mm$^2$ by the heating, it is possible to draw the second noncoated portion with smaller tension. A heating temperature is preferably from 60° C. to 140° C. It is possible to attain the above-described effects by heating at 60° C. or more. Further, by heating at 140° C. or less, the binder contained in the active material layer is altered by the high temperature so that battery property deterioration can be prevented. The heating temperature is more preferably from 100° C. to 140° C. Hot air, an infrared ray heater, an electromagnetic induction heater, or the like may be used for the heating. Alternatively, the heating may be performed by bringing the electrode into contact with a heated roller. In the case where the tension processing is performed under heating, the tension T may preferably be within a range of 50 N/m to 400 N/m.

<Nonaqueous Electrolyte>

As the nonaqueous electrolyte, a liquid nonaqueous electrolyte or a gel nonaqueous electrolyte may be used. It is possible to prepare the liquid nonaqueous electrolyte by dissolving an electrolyte into an organic solvent. It is possible to prepare the gel nonaqueous electrolyte by comprising a liquid electrolyte and a polymer material.

A concentration of the electrolyte in the liquid nonaqueous electrolyte may preferably be within a range of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethasulfonate ($LiCF_3SO_3$), and lithium bistrifluoromethylsulfonylimide [$LiN(CF_3SO_2)_2$] and mixtures thereof. The electrolyte may preferably be the one that is difficult to be oxidized at a high potential, and $LiPF_6$ is most preferred.

Examples of the organic solvent include a cyclic carbonate such as propylene carbonate (PC), ethylene carbonate (EC), and vinylene carbonate; a chained carbonate such as diethyl carbonate (DEC), dimethyl carbonate (DMC), and methylethyl carbonate (MEC); a cyclic ether such as tetrahydrofuran (THF), 2-methyltetrahydrofuran (2MeTHF), and dioxolan (DOX); a chained ether such as dimethoxyethane (DME) and diethoxyethane (DEE); γ-butyrolactone (GBL); acetonitrile (AN); and sulfolane (SL). The organic solvents may be used alone or as a mixed solvent.

Examples of the polymer material include polyvinylidene fluoride (PVdF), polyacrylonitrile (PAN), and polyethylene oxide (PEO).

Alternatively, an ambient temperature molten salt (ionic melt), a polymeric solid electrolyte, an inorganic solid electrolyte, or the like may be used as the nonaqueous electrolyte.

The ambient temperature molten salt means a compound which is capable of existing as a liquid at an ambient temperature (15° C. to 25° C.) among organic salts formed of a combination between organic cation and anion. The ambient temperature molten salt include those which as a single substance exist as a liquid, those which become a liquid when mixed with an electrolyte, and those which become liquid when dissolved into an organic solvent. In general, a melting point of the ambient temperature molten salt to be used as the nonaqueous electrolyte battery is 25° C. or less. Further, the organic cation has a quaternary ammonium skeleton.

The polymeric solid electrolyte is prepared by dissolving an electrolyte into a polymer material, followed by solidification.

The inorganic solid electrolyte is a solid substance having lithium ion conductivity.

<Separator>

As the separator, for example, a porous film formed from a material such as polyethylene, polypropylene, cellulose, and polyvinylidene fluoride (PVdF), a synthetic resin nonwoven cloth, and the like are usable. Among the above, the porous film made from polyethylene or polypropylene is capable of melting at a certain temperature and cutting off a current. Therefore, such porous film is preferred from the viewpoint of safety improvement.

Further, since the porous film formed from cellulose is capable of containing a larger amount of electrolyte as compared to a separator made from a different material and having an identical thickness with the separator, the porous film has relatively large conductivity for lithium ions in the electrolyte and is suitably used in a high output type nonaqueous electrolyte battery in which a large current is inevitably flown.

<Container>

As the container, a container in the form of a bag or a metal container made from a laminate film is usable. A thickness of the laminate film may preferably be 0.5 mm or less, more preferably 0.2 mm or less. A thickness of the metal container may preferably be 1.0 mm or less, more preferably 0.5 mm or less, and further preferably 0.3 mm or less.

A shape of the container may be a flat shape (thin shape), a square shape, a cylindrical shape, a coin shape, a button shape, or the like. The container may be a container for a small battery which is mounted to a mobile electronic appliance, etc. and a container for a large battery which is mounted to a vehicle having 2 to 4 wheels, for example, according to a battery dimension.

As the laminate film, a multilayer film in which a metal layer is inserted between resin layers may be used. The metal layer may preferably be an aluminum foil or an aluminum alloy foil for attaining a light weight. The resin layers are used for reinforcing the metal layer. Examples of the resin include a polymer material such as polypropylene (PP), polyethylene (PE), nylon, and polyethylene terephthalate (PET). The laminate film may be shaped into the shape of the container by sealing by thermal fusion bonding.

The metal container is made from aluminum or an aluminum alloy. The aluminum alloy may preferably be the one containing an element such as magnesium, zinc, silicone, and the like. In the case where a transition metal such as iron, copper, nickel, and chromium is contained in the alloy, content thereof is preferably 1% by mass or less. Thus, it is possible to dramatically improve long term reliability and heat dissipation property under high temperature environment.

According to the above-described embodiment, it is possible to provide the nonaqueous electrolyte battery having small internal resistance and excellent large current property.

Though the nonaqueous electrolyte secondary battery using the wound electrode group is taken as the example in the foregoing embodiment, the embodiment is not limitative, and a laminate electrode group may be used in place of the wound electrode group.

Second Embodiment

A nonaqueous electrolyte battery according to a second embodiment has the same configuration as the first embodiment except for using a positive electrode which is described below.

A positive electrode 4 is provided with a positive electrode current collector 4a and a positive electrode active material layer 4b. The positive electrode active material layer 4b includes a positive electrode active material and arbitrarily includes a conductive agent and a binder. The positive electrode active material layer 4b is provided on one or both of surfaces of the positive electrode current collector 4a. The positive electrode active material, a conductive agent, a binder, a mixing ratio thereof, and the positive electrode current collector are the same as those described in the first embodiment.

Figure 4:
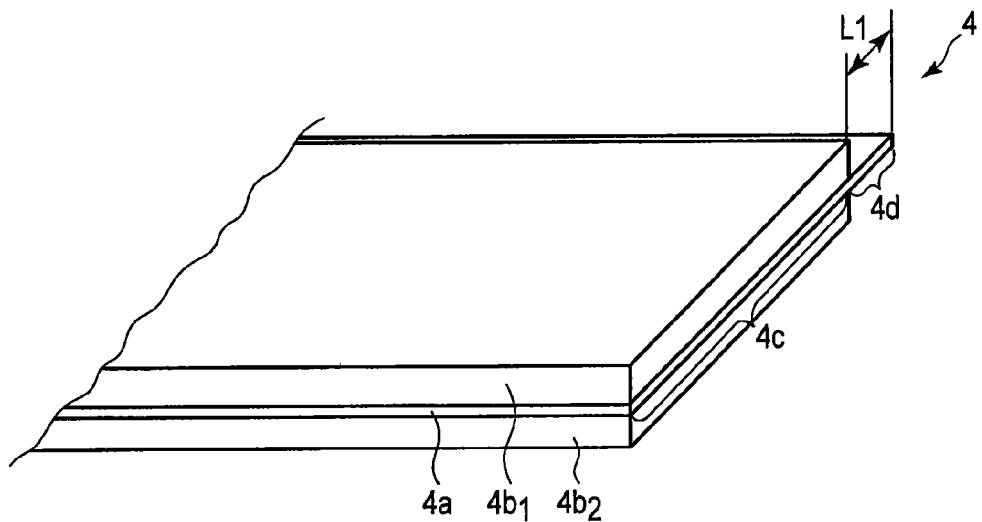
FIG. 4 is a perspective view showing a part of a positive electrode.

FIG. 4 is a perspective view showing one example of the positive electrode. FIG. 4 shows a part of the positive electrode 4 in which the positive electrode active material layer 4b is provided on each of both surfaces of the positive electrode current collector 4a. One of surfaces of the positive electrode current collector 4a which is opposed to a negative electrode 5 is referred to as a first surface. A first positive electrode active material layer $4b_1$ is provided on a part of the first surface. A second positive electrode active material layer $4b_2$ is provided on a part of a surface reverse to the first surface of the positive electrode current collector 4a.

The positive electrode current collector 4a includes a first coated portion 4c on which the first positive electrode active material layer $4b_1$ is provided and a first noncoated portion 4d which is adjacent to the first coated portion 4c in a direction parallel to the first surface, in which the first positive electrode active material layer $4b_1$ is not present.

The first noncoated portion 4d is adjacent to at least one edge of the positive electrode current collector 4a and extends along the at least one edge. The first noncoated portion 4d functions as a positive electrode tab. The positive electrode terminal 7 shown in FIG. 1 is connected to the first noncoated portion 4d directly or via a conduction member such as a lead. Thus, the positive electrode 4 and the positive electrode terminal 7 are electrically connected to each other.

In the present embodiment, a length from a boundary between the first coated portion 4c and the first noncoated portion 4d to the edge to which the first noncoated portion 4d is adjacent is referred to as L1. L1 is within a range of 5 mm to 20 mm. When L1 is 5 mm or more, it is possible to increase a contact area for the first noncoated portion 4d with the positive electrode terminal 7 or the conduction member. Thus, it is possible to reduce a contact resistance between them. As a result, a reduction of internal resistance is enabled. Further, it is possible to prevent a reduction of energy density by keeping L1 to 20 mm or less. A minimum value of the length from the boundary between the first coated portion 4c and the first noncoated portion 4d to the edge of the positive electrode current collector is 5 mm or more, and a maximum value of the length is 20 mm or less.

Further, in the present embodiment, a density of the first positive electrode active material layer $4b_1$ is within a range of 3.1 g/cc to 3.4 g/cc. When the density of the first positive electrode active material layer $4b_1$ is within the above range, it is possible to improve physical contact for the positive electrode current collector 4a with the positive electrode active material. As a result, it is possible to reduce the internal resistance inside the electrode. Further, a density of the second positive electrode active material layer $4b_2$ is preferably within the above-specified range.

As used herein, the term "density" means a value calculated from a volume and a mass, in which the volume is calculated by measuring a thickness and an area of the positive electrode active material layer. More specifically, the term "density" means a so-called bulk density which is a density in the case where pores including both of apertures communicated with an ambient air and apertures which are not communicated with the ambient air and are isolated in the positive electrode active material layer are counted into the calculation.

A ratio W1/W2 of a mass of the first coated portion 4c per unit area (W1) to a mass of the first noncoated portion 4d per unit area (W2) is from 0.997 to 1. The mass ratio W1/W2 is obtained by measuring a mass per unit area (for example, $g/cm^2$) of each of the first coated portion 4c and the first noncoated portion 4d and calculating from the results.

The second positive electrode active material layer $4b_2$ is preferably provided only on the first coated portion. More specifically, the first positive electrode active material layer $4b_1$ and the second positive electrode active material layer $4b_2$ are preferably provided at positions where they are opposed to each other with the positive electrode current collector 4a being sandwiched therebetween.

When the mass ratio (W1/W2) is within the above range, it is possible to diminish a difference in mass per unit area between the first coated portion 4c and the first noncoated portion 4d. Accordingly, it is possible to diminish skewness of the electrode. When the skewness of the electrode is small, a gap is unlikely to be formed between the electrodes in winding or stacking the electrodes. As a result, it is possible to reduce the electric resistance inside the cell. Thus, it is possible to provide the positive electrode having small internal resistance.

It is possible to further improve the large current property of the nonaqueous electrolyte battery by using the positive electrode having the above-described configuration.

Hereinafter, a positive electrode production method in the present embodiment will be described.

To start with, a slurry is prepared by suspending the positive electrode active material, the conductive agent, and the binder into a solvent. As the solvent, N-methylethyl pyrrolidone may be used, for example. A mixing ratio of a total mass of the positive electrode active material, the conductive agent, and the binder and a mass of the solvent may preferably be within a range of 50:50 to 80:20.

Next, a positive electrode active material layer is formed by coating the slurry on one or both of surfaces of the positive electrode current collector, followed by drying. The slurry is coated on the positive electrode current collector except for the first noncoated portions which are successively aligned at a constant width. The first noncoated portion is preferably adjacent to an edge which is along a longitudinal direction of the positive electrode current collector. Alternatively, two first noncoated portions may be provided in such a manner that the first noncoated portions respectively are adjacent to both edges which are along the longitudinal direction of the positive electrode current collector. A length of the first noncoated portion is adjusted to be within a range of 5 mm to 20 mm. The length of the first noncoated portion means a length from a boundary between the first coated portion and the first noncoated portion to the edge of the positive electrode current collector to which the first noncoated portion is adjacent. If the positive electrode is used for a wound electrode group, the length means a length which is in a direction perpendicular to the longitudinal direction.

Next, the positive electrode current collector on which the positive electrode active material layer is formed is rolled in such a manner that a density of the positive electrode active material layer is within a range of 3.1 g/cc to 3.4 g/cc. The rolling may be performed using a roller press machine.

In the rolling step, the positive electrode current collector is rolled together with the positive electrode active material layer. However, since a diameter of the roller is constant, the roller does not contact with the noncoated portion on which the active material layer is not coated. Therefore, the coated portion on which the active material layer is coated is rolled to reduce the mass per unit area (W1), whereas the first noncoated portion is not rolled to keep the mass per unit area (W2) unchanged. As a result, the mass of the first coated portion per unit area (W1) is smaller than the mass of the first noncoated portion per unit area (W2). More specifically, the mass ratio (W1/W2) is less than 1.0, for example, about 0.995. It is difficult to make the mass ratio (W1/W2) to be 0.997 or more even if the rolling is performed using a roller having a diameter exceeding 400 mm, for example.

In the case where the mass ratio (W1/W2) is less than 0.997, a stress is generated on a boundary between the first coated portion and the first noncoated portion to cause skewness on the entire electrode. The skewed electrode generates a gap between electrodes when the electrodes are wound or cut into a predetermined size and stacked, thereby increasing a gap between electrode plates of the positive electrode and the negative electrode. As a result, an electric resistance inside the battery is increased, thus, a large current property is deteriorated.

However, according to the present embodiment, it is possible to make the mass ratio (W1/W2) to be 0.997 or more by reducing the mass per unit area (W2) by drawing the first noncoated portion. The drawing of the first noncoated portion is realized by performing tension processing on the entire positive electrode. In the tension processing, tension is applied to the entire positive electrode in a direction parallel to the boundary between the first coated portion and the first noncoated portion. The tension processing enables selective drawing of the first noncoated portion.

It is possible to perform the tension processing in the same manner as in the negative electrode production method of the first embodiment.

As described above, the electrode group is formed of the positive electrode 4, the negative electrode 5, and the separator 6. The separator includes first and second portions which are separated from each other and a third portion which is positioned between the first and second portions. The third portion of the separator is positioned between the first coated portion of the positive electrode and the second coated portion of the negative electrode. The first noncoated portion of the positive electrode is preferably opposed to the first portion of the separator, and the second noncoated portion of the negative electrode is preferably opposed to the second portion of the separator. In the case of the wound electrode group, the first noncoated portion of the positive electrode is preferably positioned on an opposite side to a side on which the second noncoated portion of the negative electrode is positioned, in a direction of a winding axis.

According to the above-described embodiment, it is possible to provide the nonaqueous electrolyte battery which has a more excellent large current property since both the positive electrode and the negative electrode have a small electric resistance.

EXAMPLES

Hereinafter, the foregoing embodiments will be described in more details based on examples, but it should be understood that the present invention is not limited to the examples described below without deviating from the spirit of the present invention.

Comparative Example 1

Production of the Positive Electrode $LiCoO_2$ was used as a positive electrode active material; acetylene black and carbon black were used as conductive agents; and polyvinylidene fluoride was used as a binder. The components were mixed at a mass ratio of 85:5:5:5, and a slurry was obtained by dispersing the mixture into an organic solvent. The slurry was coated on an aluminum foil having a thickness of 20 μm, followed by drying, thereby forming an active material layer. Likewise, an active material layer was formed on a reverse surface of the aluminum foil by coating the slurry, followed by drying. The active material layers on the both surfaces of the aluminum foil were formed in such a manner that the sides thereof in a longitudinal direction were aligned. More specifically, a misalignment between the sides was kept within 0.5 mm.

The aluminum foil having the active material layers on both surfaces and obtained as described above was cut at a constant width to obtain a non-rolled positive electrode in which a noncoated portion having a width of 15 mm was present on one end in the longitudinal direction. The non-rolled positive electrode was rolled using a roller press machine to obtain a positive electrode. In the rolling, a load of the roller press machine was adjusted to attain an active material layer density of 3.2 g/cc.

<Production of the Negative Electrode>

$Li_4Ti_5O_{12}$ was used as a negative electrode active material; carbon black was used as conductive agents; and polyvinylidene fluoride was used as a binder. The components were mixed at a mass ratio of 85:10:5, and a slurry was obtained by dispersing the mixture into an organic solvent. The slurry was coated on an aluminum foil having a thickness of 20 μm, followed by drying, thereby forming an active material layer. Likewise, an active material layer was formed on a reverse surface of the aluminum foil by coating the slurry, followed by drying. The active material layers on the both surfaces of the aluminum foil were formed in such a manner that the sides thereof in a longitudinal direction were aligned. More specifically, a misalignment between the sides was kept within 0.5 mm.

The aluminum foil having the active material layers on both surfaces and obtained as described above was cut at a constant width to obtain a non-rolled negative electrode in which a noncoated portion having a width of 15 mm was present on one end in the longitudinal direction. The non-rolled negative electrode was rolled using a roller press machine to obtain a negative electrode. In the rolling, a load of the roller press machine was adjusted to attain an active material layer density of 2.2 g/cc.

<Production of the Nonaqueous Electrolyte Secondary Battery>

An electrode group was obtained by laminating the positive electrode and the negative electrode which were produced as described above with a separator being sandwiched therebetween, followed by winding in the form of a coil. The noncoated portions of the positive electrodes were projected from one end of the electrode group, and the noncoated portions of the negative electrodes were projected from the other end of the electrode group. The noncoated portions of the positive electrodes were bundled, and a positive electrode terminal was bonded by ultrasonic welding. Likewise, the noncoated portions of the negative electrodes were bundled, and a negative electrode terminal was bonded by ultrasonic welding. An aluminum plate was used for each of the positive and negative electrode terminals.

The electrode group was placed in a container made from an aluminum laminate, and a nonaqueous electrolyte was injected, followed by tightly sealing, thereby obtaining a nonaqueous electrolyte secondary cell.

<Mass Ratio (W1/W2) Measurement>

From a positive electrode which was produced in the same manner as the positive electrode used for the above-described nonaqueous electrolyte secondary battery production, a coated portion was cut out. The active material on a surface of the coated portion was removed using an organic solvent. A mass and an area of the remaining aluminum foil were measured to calculate a mass W1 per unit area. Further, a noncoated portion was cut out, and a mass and an area thereof were measured to calculate a mass W2 per unit area. A mass ratio (W1/W2) of the positive electrode was 0.995.

From a negative electrode which was produced in the same manner as the negative electrode used for the above-described nonaqueous electrolyte secondary battery production, a coated portion was cut out. The active material on a surface of the coated portion was removed using an organic solvent. A mass and an area of the remaining aluminum foil were measured to calculate a mass W1 per unit area. Further, a noncoated portion was cut out, and a mass and an area thereof were measured to calculate a mass W2 per unit area. A mass ratio (W1/W2) of the negative electrode was 0.995.

<Discharge Test>

A discharge test was conducted using the nonaqueous electrolyte secondary battery produced as described above.

The battery was charged to a half of a capacity of a full charge. After that, discharge was conducted at a current of 20 C, and a product of a voltage of 10 seconds after the start of the discharge and the discharge current was obtained to calculate an output.

Example 1

After producing a positive electrode in the same manner as in Comparative Example 1, tension processing was performed. The tension processing was performed by rewinding the positive electrode through an electrode rewinder provided with a withdrawing device and a winding device by setting tension to 500 N/m.

A negative electrode and a nonaqueous electrolyte secondary battery were produced in the same manner as in Comparative Example 1. The measurement and the discharge test were conducted using the cell. A density of the active material layer, a mass ratio (W1/W2), and a length of the noncoated portion of each of the positive electrode and the negative electrode are shown in Table 1.

Example 2

After producing a negative electrode in the same manner as in Comparative Example 1, tension processing was performed. The tension processing was performed by rewinding the negative electrode through an electrode rewinder provided with a withdrawing device and a winding device by setting tension to 500 N/m.

A positive electrode and a nonaqueous electrolyte secondary battery were produced in the same manner as in Comparative Example 1. The measurement and the discharge test were conducted using the cell. A density of the active material layer, a mass ratio (W1/W2), and a length of the noncoated portion of each of the positive electrode and the negative electrode are shown in Table 1.

Example 3

A nonaqueous electrolyte secondary battery was produced in the same manner as in Comparative Example 1 except for using a positive electrode produced in the same manner as in Example 1 and a negative electrode produced in the same manner as in Example 2. The measurement and the discharge test were conducted using the cell. A density of the active material layer, a mass ratio (W1/W2), and a length of the noncoated portion of each of the positive electrode and the negative electrode are shown in Table 1.

Comparative Example 2

A nonaqueous electrolyte secondary battery was produced in the same manner as in Comparative Example 1 except for the length of 10 mm for each of the noncoated portions of the positive electrode and the negative electrode. The measurement and the discharge test were conducted using the cell. A density of the active material layer, a mass ratio (W1/W2), and a length of the noncoated portion of each of the positive electrode and the negative electrode are shown in Table 1.

Example 4

A nonaqueous electrolyte secondary battery was produced in the same manner as in Comparative Example 1 except for subjecting the positive electrode of Comparative Example 2 to tension processing. The measurement and the discharge test were conducted using the cell. A density of the active material layer, a mass ratio (W1/W2), and a length of the noncoated portion of each of the positive electrode and the negative electrode are shown in Table 1. The tension processing was performed in the manner as described in Example 1.

Example 5

A nonaqueous electrolyte secondary battery was produced in the same manner as in Comparative Example 1 except for subjecting the negative electrode of Comparative Example 2 to tension processing. The measurement and the discharge test were conducted using the cell. A density of the active material layer, a mass ratio (W1/W2), and a length of the noncoated portion of each of the positive electrode and the negative electrode are shown in Table 1. The tension processing was performed in the manner as described in Example 1.

Example 6

A nonaqueous electrolyte secondary battery was produced in the same manner as in Comparative Example 1 except for subjecting each of the positive electrode and the negative electrode of Comparative Example 2 to tension processing. The measurement and the discharge test were conducted using the cell. A density of the active material layer, a mass ratio (W1/W2), and a length of the noncoated portion of each of the positive electrode and the negative electrode are shown in Table 1. The tension processing was performed in the manner as described in Example 1.

Comparative Example 3

A nonaqueous electrolyte secondary battery was produced in the same manner as in Comparative Example 1 except for the length of 5 mm for each of the noncoated portions of the positive electrode and the negative electrode. The measurement and the discharge test were conducted using the cell. A density of the active material layer, a mass ratio (W1/W2), and a length of the noncoated portion of each of the positive electrode and the negative electrode are shown in Table 1.

Example 7

A nonaqueous electrolyte secondary battery was produced in the same manner as in Comparative Example 1 except for subjecting the positive electrode of Comparative Example 3 to tension processing. The measurement and the discharge test were conducted using the cell. A density of the active material layer, a mass ratio (W1/W2), and a length of the noncoated portion of each of the positive electrode and the negative electrode are shown in Table 1. The tension processing was performed in the manner as described in Example 1.

Example 8

A nonaqueous electrolyte secondary battery was produced in the same manner as in Comparative Example 1 except for subjecting the negative electrode of Comparative Example 3 to tension processing. The measurement and the discharge test were conducted using the cell. A density of the active material layer, a mass ratio (W1/W2), and a length of the noncoated portion of each of the positive electrode and the negative electrode are shown in Table 1. The tension processing was performed in the manner as described in Example 1.

Example 9

A nonaqueous electrolyte secondary battery was produced in the same manner as in Comparative Example 1 except for subjecting each of the positive electrode and the negative electrode of Comparative Example 3 to tension processing. The measurement and the discharge test were conducted using the cell. A density of the active material layer, a mass ratio (W1/W2), and a length of the noncoated portion of each of the positive electrode and the negative electrode are shown in Table 1. The tension processing was performed in the manner as described in Example 1.

Comparative Example 4

A nonaqueous electrolyte secondary battery was produced in the same manner as in Comparative Example 1 except for the length of 2 mm for each of the noncoated portions of the positive electrode and the negative electrode. The measurement and the discharge test were conducted using the cell. A density of the active material layer, a mass ratio (W1/W2), and a length of the noncoated portion of each of the positive electrode and the negative electrode are shown in Table 2.

Comparative Example 5

A nonaqueous electrolyte secondary battery was produced in the same manner as in Comparative Example 1 except for subjecting the positive electrode of Comparative Example 4 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 6

A nonaqueous electrolyte secondary battery was produced in the same manner as in Comparative Example 1 except for subjecting the negative electrode of Comparative Example 4 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 7

A nonaqueous electrolyte secondary battery was produced in the same manner as in Comparative Example 1 except for subjecting each of the positive electrode and the negative electrode of Comparative Example 4 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 8

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted using the cell. A density of the active material layer, a mass ratio (W1/W2), and a length of the noncoated portion of each of the positive electrode and the negative electrode are shown in Table 2.

Example 10

A nonaqueous electrolyte secondary battery was produced in the same manner as in Comparative Example 1 except for subjecting the positive electrode of Comparative Example 8 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Example 11

A nonaqueous electrolyte secondary battery was produced in the same manner as in Comparative Example 1 except for subjecting the negative electrode of Comparative Example 8 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Example 12

A nonaqueous electrolyte secondary battery was produced in the same manner as in Comparative Example 1 except for subjecting each of the positive electrode and the negative electrode of Comparative Example 8 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 9

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted using the cell. A density of the active material layer, a mass ratio (W1/W2), and a length of the noncoated portion of each of the positive electrode and the negative electrode are shown in Table 2.

Comparative Example 10

A nonaqueous electrolyte secondary battery was produced in the same manner as in Comparative Example 1 except for subjecting the positive electrode of Comparative Example 9 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 11

A nonaqueous electrolyte secondary battery was produced in the same manner as in Comparative Example 1 except for subjecting the negative electrode of Comparative Example 9 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 12

A nonaqueous electrolyte secondary battery was produced in the same manner as in Comparative Example 1 except for subjecting each of the positive electrode and the negative electrode of Comparative Example 9 to tension processing. The measurement and the discharge test were conducted using the cell. A density of the active material layer, a mass ratio (W1/W2), and a length of the noncoated portion of each of the positive electrode and the negative electrode are shown in Table 2. The tension processing was performed in the manner as described in Example 1.

Comparative Example 13

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted using the cell. A density of the active material layer, a mass ratio (W1/W2), and a length of the noncoated portion of each of the positive electrode and the negative electrode are shown in Table 3.

Example 13

A nonaqueous electrolyte secondary battery was produced in the same manner as in Comparative Example 1 except for subjecting the positive electrode of Comparative Example 13 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Example 14

A nonaqueous electrolyte secondary battery was produced in the same manner as in Comparative Example 1 except for subjecting the negative electrode of Comparative Example 13 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Example 15

A nonaqueous electrolyte secondary battery was produced in the same manner as in Comparative Example 1 except for subjecting each of the positive electrode and the negative electrode of Comparative Example 13 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Comparative Example 14

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted using the cell. A density of the active material layer, a mass ratio (W1/W2), and a length of the noncoated portion of each of the positive electrode and the negative electrode are shown in Table 3.

Comparative Example 15

A nonaqueous electrolyte secondary battery was produced in the same manner as in Comparative Example 1 except for using $LiNi_{0.8}Co_{0.17}Al_{0.03}O_2$ as the positive electrode active material. The measurement and the discharge test were conducted using the cell. A density of the active material layer, a mass ratio (W1/W2), and a length of the noncoated portion of each of the positive electrode and the negative electrode are shown in Table 3.

Example 16

A nonaqueous electrolyte secondary battery was produced in the same manner as in Comparative Example 1 except for subjecting the positive electrode of Comparative Example 15 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Example 17

A nonaqueous electrolyte secondary battery was produced in the same manner as in Comparative Example 1 except for subjecting the negative electrode of Comparative Example 15 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Example 18

A nonaqueous electrolyte secondary battery was produced in the same manner as in Comparative Example 1 except for subjecting each of the positive electrode and the negative electrode of Comparative Example 15 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Comparative Example 16

A nonaqueous electrolyte secondary battery was produced in the same manner as in Comparative Example 1 except for using $Li_{1.1}Mn_{1.8}Al_{0.1}O_4$ as the positive electrode active material. The measurement and the discharge test were conducted using the cell. A density of the active material layer, a mass ratio (W1/W2), and a length of the noncoated portion of each of the positive electrode and the negative electrode are shown in Table 3.

Example 19

A nonaqueous electrolyte secondary battery was produced in the same manner as in Comparative Example 1 except for subjecting the positive electrode of Comparative Example 16 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Example 20

A nonaqueous electrolyte secondary battery was produced in the same manner as in Comparative Example 1 except for subjecting the negative electrode of Comparative Example 16 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

Example 21

A nonaqueous electrolyte secondary battery was produced in the same manner as in Comparative Example 1 except for subjecting each of the positive electrode and the negative electrode of Comparative Example 16 to tension processing. The measurement and the discharge test were conducted using the cell. A density of the active material layer, a mass ratio (W1/W2), and a length of the noncoated portion of each of the positive electrode and the negative electrode are shown in Table 3. The tension processing was performed in the manner as described in Example 1.

<Results>

A ratio of the output of each of Examples and Comparative Examples to the output of Comparative Example 1 was calculated. The results are shown in Tables 1-3.

TABLE 1

| | Positive electrode | | | | Negative electrode | | | | |
| --- | --- | --- | --- | --- | --- | --- | --- | --- | --- |
| | Positive electrode active material | Density (g/cc) | W1/W2 | Noncoated portion length (mm) | Negative electrode active material | Density (g/cc) | W1/W2 | Noncoated portion length (mm) | Output ratio |
| Comparative Example 1 | $LiCoO_2$ | 3.2 | 0.995 | 15 | $Li_4Ti_5O_{12}$ | 2.2 | 0.995 | 15 | 1 |
| Example 1 | $LiCoO_2$ | 3.2 | 0.997 | 15 | $Li_4Ti_5O_{12}$ | 2.2 | 0.995 | 15 | 1.1 |
| Example 2 | $LiCoO_2$ | 3.2 | 0.995 | 15 | $Li_4Ti_5O_{12}$ | 2.2 | 0.997 | 15 | 1.1 |
| Example 3 | $LiCoO_2$ | 3.2 | 0.997 | 15 | $Li_4Ti_5O_{12}$ | 2.2 | 0.997 | 15 | 1.2 |
| Comparative Example 2 | $LiCoO_2$ | 3.2 | 0.995 | 10 | $Li_4Ti_5O_{12}$ | 2.2 | 0.995 | 10 | 0.9 |
| Example 4 | $LiCoO_2$ | 3.2 | 0.998 | 10 | $Li_4Ti_5O_{12}$ | 2.2 | 0.995 | 10 | 1.05 |
| Example 5 | $LiCoO_2$ | 3.2 | 0.995 | 10 | $Li_4Ti_5O_{12}$ | 2.2 | 0.997 | 10 | 1.0 |
| Example 6 | $LiCoO_2$ | 3.2 | 0.998 | 10 | $Li_4Ti_5O_{12}$ | 2.2 | 0.997 | 10 | 1.1 |
| Comparative Example 3 | $LiCoO_2$ | 3.2 | 0.995 | 5 | $Li_4Ti_5O_{12}$ | 2.2 | 0.995 | 5 | 0.7 |
| Example 7 | $LiCoO_2$ | 3.2 | 0.998 | 5 | $Li_4Ti_5O_{12}$ | 2.2 | 0.995 | 5 | 0.75 |
| Example 8 | $LiCoO_2$ | 3.2 | 0.995 | 5 | $Li_4Ti_5O_{12}$ | 2.2 | 0.997 | 5 | 0.75 |
| Example 9 | $LiCoO_2$ | 3.2 | 0.998 | 5 | $Li_4Ti_5O_{12}$ | 2.2 | 0.997 | 5 | 0.8 |

TABLE 2

| | Positive electrode | | | | Negative electrode | | | | |
| --- | --- | --- | --- | --- | --- | --- | --- | --- | --- |
| | Positive electrode active material | Density (g/cc) | W1/W2 | Noncoated portion length (mm) | Negative electrode active material | Density (g/cc) | W1/W2 | Noncoated portion length (mm) | Output ratio |
| Comparative Example 4 | $LiCoO_2$ | 3.2 | 0.995 | 2 | $Li_4Ti_5O_{12}$ | 2.2 | 0.995 | 2 | 0.2 |
| Comparative Example 5 | $LiCoO_2$ | 3.2 | 0.998 | 2 | $Li_4Ti_5O_{12}$ | 2.2 | 0.995 | 2 | 0.2 |
| Comparative Example 6 | $LiCoO_2$ | 3.2 | 0.995 | 2 | $Li_4Ti_5O_{12}$ | 2.2 | 0.997 | 2 | 0.2 |
| Comparative Example 7 | $LiCoO_2$ | 3.2 | 0.998 | 2 | $Li_4Ti_5O_{12}$ | 2.2 | 0.997 | 2 | 0.2 |
| Comparative Example 8 | $LiCoO_2$ | 3.1 | 0.995 | 15 | $Li_4Ti_5O_{12}$ | 2.1 | 0.995 | 15 | 1 |
| Example 10 | $LiCoO_2$ | 3.1 | 0.997 | 15 | $Li_4Ti_5O_{12}$ | 2.1 | 0.995 | 15 | 1.1 |
| Example 11 | $LiCoO_2$ | 3.1 | 0.995 | 15 | $Li_4Ti_5O_{12}$ | 2.1 | 0.997 | 15 | 1.1 |
| Example 12 | $LiCoO_2$ | 3.1 | 0.997 | 15 | $Li_4Ti_5O_{12}$ | 2.1 | 0.997 | 15 | 1.2 |
| Comparative Example 9 | $LiCoO_2$ | 3.0 | 0.996 | 15 | $Li_4Ti_5O_{12}$ | 2.0 | 0.996 | 15 | 0.5 |
| Comparative Example 10 | $LiCoO_2$ | 3.0 | 0.998 | 15 | $Li_4Ti_5O_{12}$ | 2.0 | 0.996 | 15 | 0.5 |
| Comparative Example 11 | $LiCoO_2$ | 3.0 | 0.996 | 15 | $Li_4Ti_5O_{12}$ | 2.0 | 0.997 | 15 | 0.5 |
| Comparative Example 12 | $LiCoO_2$ | 3.0 | 0.998 | 15 | $Li_4Ti_5O_{12}$ | 2.0 | 0.997 | 15 | 0.5 |

TABLE 3

| | Positive electrode | | | | Negative electrode | | | | |
| --- | --- | --- | --- | --- | --- | --- | --- | --- | --- |
| | Positive electrode active material | Density (g/cc) | W1/W2 | Noncoated portion length (mm) | Negative electrode active material | Density (g/cc) | W1/W2 | Noncoated portion length (mm) | Output ratio |
| Comparative Example 13 | $LiCoO_2$ | 3.4 | 0.994 | 15 | $Li_4Ti_5O_{12}$ | 2.4 | 0.993 | 15 | 0.95 |
| Example 13 | $LiCoO_2$ | 3.4 | 0.997 | 15 | $Li_4Ti_5O_{12}$ | 2.4 | 0.993 | 15 | 1.0 |

TABLE 3-continued

| | Positive electrode | | | | Negative electrode | | | | |
|---|---|---|---|---|---|---|---|---|---|
| | Positive electrode active material | Density (g/cc) | W1/W2 | Noncoated portion length (mm) | Negative electrode active material | Density (g/cc) | W1/W2 | Noncoated portion length (mm) | Output ratio |
| Example 14 | $LiCoO_2$ | 3.4 | 0.994 | 15 | $Li_4Ti_5O_{12}$ | 2.4 | 0.998 | 15 | 1.05 |
| Example 15 | $LiCoO_2$ | 3.4 | 0.997 | 15 | $Li_4Ti_5O_{12}$ | 2.4 | 0.998 | 15 | 1.2 |
| Comparative Example 14 | $LiCoO_2$ | 3.5 | 0.997 | 15 | $Li_4Ti_5O_{12}$ | 2.5 | 0.998 | 15 | 0.9 |
| Comparative Example 15 | $LiNi_{0.8}Co_{0.17}Al_{0.03}O_2$ | 3.1 | 0.994 | 15 | $Li_4Ti_5O_{12}$ | 2.2 | 0.995 | 15 | 1 |
| Example 16 | $LiNi_{0.8}Co_{0.17}Al_{0.03}O_2$ | 3.1 | 0.997 | 15 | $Li_4Ti_5O_{12}$ | 2.2 | 0.995 | 15 | 1.1 |
| Example 17 | $LiNi_{0.8}Co_{0.17}Al_{0.03}O_2$ | 3.1 | 0.994 | 15 | $Li_4Ti_5O_{12}$ | 2.2 | 0.997 | 15 | 1.05 |
| Example 18 | $LiNi_{0.8}Co_{0.17}Al_{0.03}O_2$ | 3.1 | 0.997 | 15 | $Li_4Ti_5O_{12}$ | 2.2 | 0.997 | 15 | 1.2 |
| Comparative Example 16 | $Li_{1.1}Mn_{1.8}Al_{0.1}O_4$ | 3.3 | 0.995 | 15 | $Li_4Ti_5O_{12}$ | 2.2 | 0.996 | 15 | 1 |
| Example 19 | $Li_{1.1}Mn_{1.8}Al_{0.1}O_4$ | 3.3 | 0.998 | 15 | $Li_4Ti_5O_{12}$ | 2.2 | 0.996 | 15 | 1.1 |
| Example 20 | $Li_{1.1}Mn_{1.8}Al_{0.1}O_4$ | 3.3 | 0.995 | 15 | $Li_4Ti_5O_{12}$ | 2.2 | 0.998 | 15 | 1.05 |
| Example 21 | $Li_{1.1}Mn_{1.8}Al_{0.1}O_4$ | 3.3 | 0.998 | 15 | $Li_4Ti_5O_{12}$ | 2.2 | 0.998 | 15 | 1.2 |

Example 2 in which the mass ratio (W1/W2) of the negative electrode is 0.997 or more has a higher output ratio than Comparative Example 1. Example 3 in which the mass ratio (W1/W2) of each of the positive electrode and the negative electrode is 0.997 or more has a much higher output ratio than Example 2.

Example 5 in which the mass ratio (W1/W2) of the negative electrode is 0.997 or more has a higher output ratio than Comparative Example 2. Example 6 in which the mass ratio (W1/W2) of each of the positive electrode and the negative electrode is 0.997 or more has a much higher output ratio than Example 5.

Example 8 in which the mass ratio (W1/W2) of the negative electrode is 0.997 or more has a higher output ratio than Comparative Example 3. Example 9 in which the mass ratio (W1/W2) of each of the positive electrode and the negative electrode is 0.997 or more has a much higher output ratio than Example 8.

Example 11 in which the mass ratio (W1/W2) of the negative electrode is 0.997 or more has a higher output ratio than Comparative Example 8. Example 12 in which the mass ratio (W1/W2) of each of the positive electrode and the negative electrode is 0.997 or more has a much higher output ratio than Example 11.

Example 14 in which the mass ratio (W1/W2) of the negative electrode is 0.997 or more has a higher output ratio than Comparative Example 13. Example 15 in which the mass ratio (W1/W2) of each of the positive electrode and the negative electrode is 0.997 or more has a much higher output ratio than Example 14.

Each of Comparative Examples 4 to 7 in which the length of the noncoated portion of each of the positive electrode and the negative electrode is 2 mm has a low output ratio irrespective of the mass ratios (W1/W2) of the positive electrode and the negative electrode. It is considered that the output property was considerably deteriorated as a result of an increase in contact resistance caused by the insufficient contact area between the noncoated portion and the electrode terminal. Therefore, it is considered that the effects of the present invention are satisfactorily exhibited in the case where the length of the noncoated portion is 5 mm or more.

The electrode in which the length of the noncoated portion is less than 5 mm has suppressed skewness between the coated portion and the noncoated portion in the rolling processing in the production process. Therefore, it is difficult to attain the effect of the tension application of the present embodiments.

Each of Comparative Examples 9 to 12 in which the density of the positive electrode active material layer is 3.0 g/cc and the density of the negative electrode active material layer is 2.0 g/cc has a low output ratio irrespective of the mass ratios (W1/W2) of the positive electrode and the negative electrode. It is considered that the output property was deteriorated as a result of an increase in contact resistance caused by the insufficient contact between the active material and the current collector due to the low density. Therefore, it is considered that the effects of the present invention are satisfactorily exhibited in the case where the positive electrode density is 3.1 g/cc or more or the negative electrode density is 2.1 g/cc or more.

The positive electrode in which the density of the positive electrode active material layer is less than 3.1 g/cc and the negative electrode in which the density of the negative electrode active material layer is less than 2.1 g/cc have suppressed skewness between the coated portion and the noncoated portion of the current collector since they are not rolled or the rolling is insufficient in the production process. Therefore, it is difficult to attain the effect of the tension application of the present embodiments.

Comparative Example 14 in which the density of the negative electrode active material layer is 3.5 g/cc and the density of the negative electrode active material layer is 2.5 g/cc has a low output ratio though the mass ratio of each of the positive electrode and the negative electrode is 0.997 or more. It is considered that the output was reduced as a result of the shortage of the electrolyte amount which was caused by the insufficient number of clearances in the active material layers.

Example 17 in which the mass ratio (W1/W2) of the negative electrode is 0.997 or more has a higher output ratio than Comparative Example 15. Example 18 in which the mass ratio (W1/W2) of each of the positive electrode and the negative electrode is 0.997 or more has a much higher output ratio than Example 17.

Example 20 in which the mass ratio (W1/W2) of the negative electrode is 0.997 or more has a higher output ratio than Comparative Example 16. Example 21 in which the mass ratio (W1/W2) of each of the positive electrode and the negative electrode is 0.997 or more has a much higher output ratio than Example 20.

From the above results, it is shown that the battery in which the negative electrode mass ratio (W1/W2) is 0.997 or more, the length of the noncoated portion is 5 mm or more, and the density of the negative electrode active material is within the range of 2.1 g/cc or more to 2.4 g/cc or less has a higher output and more excellent large current property than the cells of Comparative Examples. Further, it is shown that the battery in which the positive electrode mass ratio (W1/W2) is 0.997 or more, the length of the noncoated portion is 5 mm or more, and the density of the positive electrode active material layer is within the range of 3.1 g/cc or more to 3.4 g/cc or less has a much higher output.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 . . . nonaqueous electrolyte cell; 2 . . . wound electrode group; 3 . . . container; 4 . . . positive electrode; 4a . . . positive electrode current collector; 4b . . . positive electrode active material layer; 4c . . . first coated portion; 4d . . . first noncoated portion; 5 . . . negative electrode; 5a . . . negative electrode current collector; 5b . . . negative electrode active material layer; 5c . . . second coated portion; 5d . . . second noncoated portion; 6 . . . separator; 7 . . . positive electrode terminal; 8 . . . negative electrode terminal.

What is claimed is:

1. A nonaqueous electrolyte secondary battery comprising: a positive electrode comprising a positive electrode current collector having a first surface and a first positive electrode active material layer provided on a part of the first surface;
a negative electrode comprising a negative electrode current collector having a second surface opposed to the first surface and a first negative electrode active material layer provided on a part of the second surface; and
a nonaqueous electrolyte,
wherein the negative electrode current collector comprises a second coated portion on which the first negative electrode active material layer is provided and a second noncoated portion which is adjacent to the second coated portion in a direction parallel to the second surface, in which the first negative electrode active material layer is not present;
the second noncoated portion is adjacent to at least an edge of the negative electrode current collector and extends along the at least an edge;
a length from a boundary between the second coated portion and the second noncoated portion to the at least an edge of the negative electrode current collector is within a range of 5 mm to 20 mm;
a density of the first negative electrode active material layer is within a range of 2.1 g/cc to 2.4 g/cc; and
a ratio W1/W2 of a mass of the second coated portion of the negative electrode current collector per unit area (W1) to a mass of the second noncoated portion of the negative electrode current collector per unit area (W2) is from 0.997 to 1
wherein the battery is obtained by a process comprising tension processing on the negative electrode.

2. The nonaqueous electrolyte secondary battery according to claim 1,
wherein the first negative electrode active material layer comprises at least a negative electrode active material selected from the group consisting of a lithium titanium oxide, $TiO_2$, and a metal composite oxide containing at least an element of P, V, Sn, Cu, Ni, Co and Fe, and Ti.

3. The nonaqueous electrolyte secondary battery according to claim 1,
wherein the first negative electrode active material layer comprises at least a negative electrode active material selected from $Li_4Ti_5O_{12}$ and $Li_2Ti_3O_7$.

4. The nonaqueous electrolyte secondary battery according to claim 1, wherein in the tension processing, tension is applied to the entire negative electrode in a direction parallel to the boundary between the second coated portion and the second noncoated portion.

5. The nonaqueous electrolyte secondary battery according to claim 1, wherein the process further comprises, prior to the tension processing on the negative electrode, rolling the negative electrode current collector together with the negative electrode active material with a roller, wherein the roller does not contact with the second noncoated portion on which the active material layer is not coated.

6. The nonaqueous electrolyte secondary battery according to claim 1,
wherein the negative electrode further comprises a second negative electrode active material layer, and the second negative electrode active material layer is opposed to the first negative electrode active material layer with the negative electrode current collector being sandwiched therebetween.

7. The nonaqueous electrolyte secondary battery according to claim 6,
wherein the first negative electrode active material layer comprises at least a negative electrode active material selected from the group consisting of a lithium titanium oxide, $TiO_2$, and a metal composite oxide containing at least an element of P, V, Sn, Cu, Ni, Co and Fe, and Ti.

8. The nonaqueous electrolyte secondary battery according to claim 6,
wherein the first negative electrode active material layer comprises at least a negative electrode active material selected from $Li_4Ti_5O_{12}$ and $Li_2Ti_3O_7$.

9. The nonaqueous electrolyte secondary battery according to claim 6,
wherein the second negative electrode active material layer is provided only on the second coated portion.

10. The nonaqueous electrolyte secondary battery according to claim 9,
wherein the first negative electrode active material layer comprises at least a negative electrode active material selected from the group consisting of a lithium titanium oxide, $TiO_2$, and a metal composite oxide containing at least an element of P, V, Sn, Cu, Ni, Co and Fe, and Ti.

11. The nonaqueous electrolyte secondary battery according to claim 9,
wherein the first negative electrode active material layer comprises at least a negative electrode active material selected from $Li_4Ti_5O_{12}$ and $Li_2Ti_3O_7$.

* * * * *